UNITED STATES PATENT OFFICE.

FRITZ GEHRE, OF ZURICH, SWITZERLAND.

PROCESS OF MANUFACTURING PLATES OR TILES.

SPECIFICATION forming part of Letters Patent No. 692,197, dated January 28, 1902.

Application filed June 15, 1898. Serial No. 683,505. (No specimens.)

*To all whom it may concern:*

Be it known that I, FRITZ GEHRE, a citizen of Germany, residing at Zurich, Switzerland, have invented certain new and useful Improvements in Processes of Manufacturing Plates or Tiles; and I do hereby declare the following to be a full, clear, and exact description of the invention, such as will enable others skilled in the art to which it appertains to make and use the same.

This invention relates to the manufacture of artificial stone, its object being to provide a process for preparing a material for making ornamental plates, tiles, &c., as a substitute for natural stone.

The invention consists in combining magnesium carbonate with chlorid of magnesium and suitable filling materials, forming an indestructible product.

I am aware that magnesia cement has been generally employed heretofore in making artificial stone; but in the manufacture of tiles or other objects made from this material they lose on an average fully twenty-five per cent., thereby shrinking to a considerable extent, and when laid they are unable to withstand atmospheric changes, they decay rapidly, become soft and spongy, and are cracked very easily. I obviate these defects by substituting for the material mentioned a magnesium carbonate.

The following is a practical exemplification of my new process: I first roast or calcine the magnesium carbonate in any suitable manner and then moisten the calcined mass with a solution composed of thirty-five parts of chlorid of magnesium, ten parts of chlorid of aluminium, and fifty-five parts of water, more or less, measured by weight. A stronger solution would be detrimental, because it would render the mass too rich, which is undesirable, as in such condition the material is liable to crack. I then add to the plastic mass thirteen parts, by weight, of chlorid of aluminium, which gives the mass a tendency to harden and makes it far more resistent to the atmosphere. I may still further increase the hardening to obtain a better binding by adding to the magnesium carbonate crystalline or dense limestone-spar in the proportions of one part of limestone-spar to four parts of the carbonate, measured by weight. The quality of spar is not material, the most suitable being the Swiss (Wallais) or the Italian spar. By this admixture the mass attains a hardness equal to marble and acquires a surface susceptible of high polish. The product can be used as a substitute for marble and resists the influence of water better than many other artificial stones. To the mass in its plastic state I preferably add light substances as a filling material—such as cork-cuttings, cork-powder, paper fiber, paper scraps, ashes, slags, rice-peeling, cut straw, sawdust, &c. I then mold the mass into blocks, slabs, tiles, &c., in the usual manner and proceed to bake the same, having previously added to the mass phosphate of aluminium in the proportions of one part of phosphate of aluminium to three parts of the chlorid of magnesium employed, measured by weight, for further facilitating the hardening of the mass.

I can also employ the ordinary magnesite in my process when I burn the same clod-hard. Without such treatment the evil effects above stated will occur.

The finished objects are extremely hard, and they may be made light or heavy, according to the filling material employed.

Having thus described my invention, what I claim as new, and desire to secure by Letters Patent of the United States, is—

1. As an improvement in the process of preparing artificial stone from magnesium carbonate, calcining the material, combining the calcined material with a solution of chlorid of magnesium, chlorid of aluminium and water, supplementing this by a further addition of chlorid of aluminium, adding limestone-spar in the proportion of one part of spar to four parts of carbonate, more or less, measured by weight, adding phosphate of aluminium, making the mass up into bodies of desired shape, and finally baking the same.

2. As an improvement in the process of preparing artificial stone from magnesium carbonate, calcining the material, combining the calcined material with a solution of chlorid of magnesium, chlorid of aluminium and water, adding limestone-spar in the proportion of one part of spar to four parts of the carbonate, more or less, measured by weight, adding phosphate of aluminium and a light filling, making the mass up into bodies of desired shape, and finally baking the same.

In testimony whereof I affix my signature in presence of two witnesses.

FRITZ GEHRE.

Witnesses:
    EUGENE GERMAIN,
    P. H. LIEBERKNECHT.